United States Patent [19]
Lakshman et al.

[11] Patent Number: 5,650,993
[45] Date of Patent: Jul. 22, 1997

[54] DROP FROM FRONT OF BUFFER POLICY IN FEEDBACK NETWORKS

[75] Inventors: Tirunell Viswanathan Lakshman, Eatontown; Arnold Leslie Neidhardt, Middletown; Teunis Jan Ott, Chester, all of N.J.

[73] Assignee: Bell Communications Research, Inc., Morristown, N.J.

[21] Appl. No.: 407,882

[22] Filed: Mar. 20, 1995

[51] Int. Cl.$^6$ .................................................. H04L 12/26
[52] U.S. Cl. ...................................................... 370/236
[58] Field of Search .......................... 370/17, 58.3, 60, 370/60.1, 68.1, 84, 110.1

[56] References Cited

U.S. PATENT DOCUMENTS

| 5,276,677 | 1/1994 | Ramamurthy et al. | 370/68.1 |
|---|---|---|---|
| 5,283,788 | 2/1994 | Morita et al. | 370/60 |
| 5,402,416 | 3/1995 | Cieslak et al. | 370/60.1 |

OTHER PUBLICATIONS

Jacobson, *Congestion Avoidance and Control*, Proc Of ACM Sigcomm, pp. 314–329 (1988).

T. V. Lakshman & U. Madhow, *Performance Analysis of Window–Based Flow Control Using TCP/IP: The Effect of High Bandwidth–Delay Products and Random Loss*, IFIP Trans. C–26, High Perf. Networking V, pp. 135–150 (1994).

A. Romanov & S. Floyd, *Dynamics of TCP Traffic over ATM Networks*, Proc. ACM Sigomm Conf., pp. 303–313 (1994).

S. Floyd & V. Jacobson, *Random Early Detection Gateways for Congestion Avoidance*, IEEE/ACM Trans. on Networking, vol. 1, No. 4, pp. 397–413, Aug. 1993.

N. Yin & M. G. Hluchyj, *Implication of Dropping Packets from the Front of the Queue*, Seventh ITC, Oct., pp. 846–851 (1990).

*Primary Examiner*—Benedict V. Safourek
*Attorney, Agent, or Firm*—Leonard Charles Suchyta; Loria B. Yeadon

[57] ABSTRACT

A method for transmitting packets or cells (or both) in a communications network 10 is disclosed. The packets or cells are transmitted along a forward communications path in a network from a source node h1 via one or more intermediary nodes r1, x1, r5 and r2 to a destination node h4. At the intermediary nodes r1, x1, r5 or r2, the packets or cells are received in a buffer 38 or 42-1 to 42-4. The packets or cells are transmitted along the forward communications path according to a transmission schedule. In the presence of congestion at one of the intermediary nodes x1, an indication of the congestion is provided to the destination nodes h4 of the first packets to be transmitted according to the schedule. An indication of the congestion of the first packets or cells is provided by the destination nodes h4 of the first packets or cells to the source nodes h1 of the first packets or cells via a feedback communications path.

12 Claims, 6 Drawing Sheets

DROP FROM FRONT OF BUFFER POLICY IN FEEDBACK NETWORKS

FIELD OF THE INVENTION

The present invention relates to communication networks comprising plural interconnected nodes.

BACKGROUND OF THE INVENTION

For purposes of clarity, packet communication and cell communication are reviewed below. Then, packet and cell loss and congestion in a communications network are discussed.

Packet Communication

Figure 1:
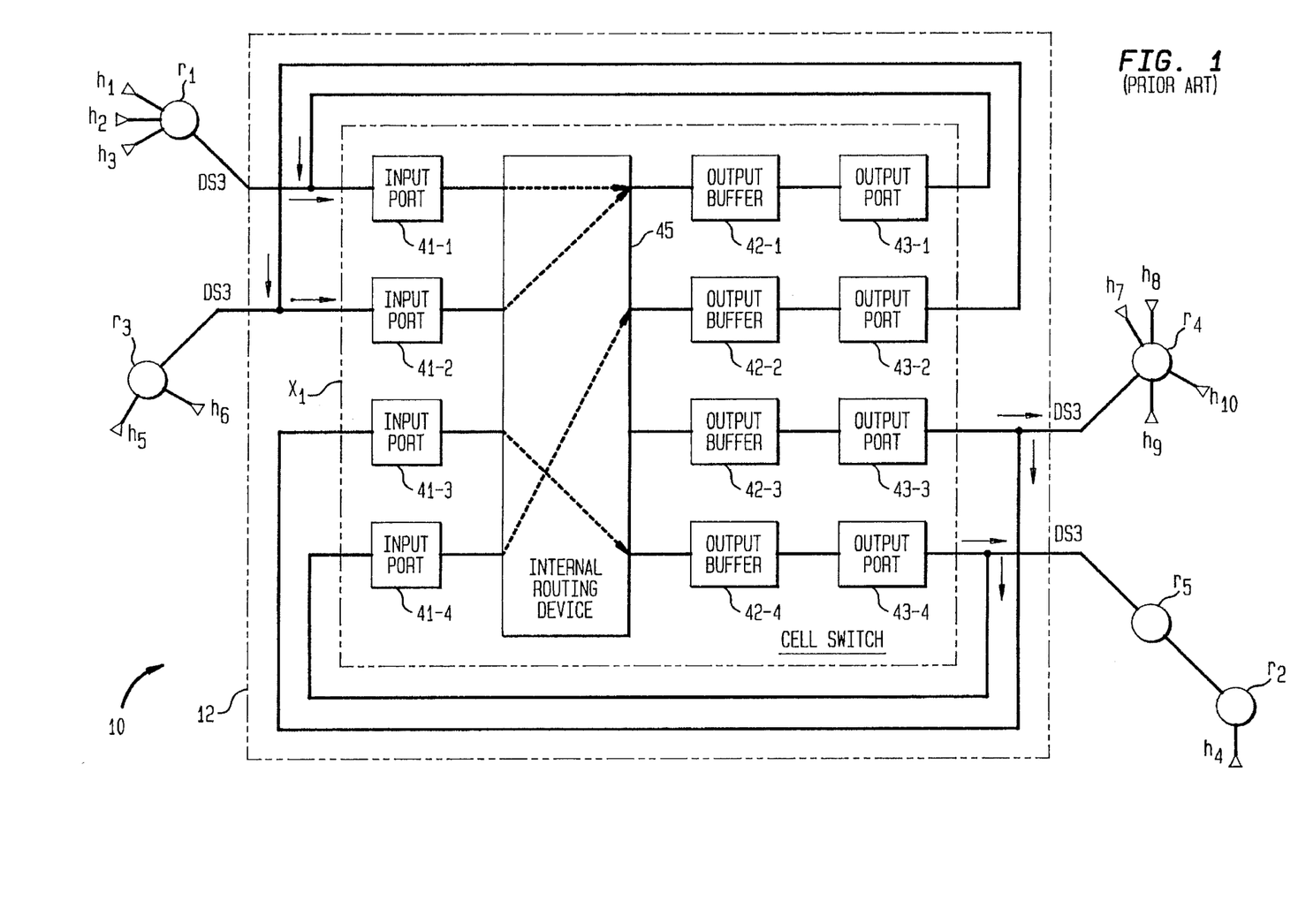
FIG. 1 shows a conventional communications network.

FIG. 1 depicts a prior art communications network 10 comprising host computers (hosts) h1-h10, router computers (routers) r1-r5 and a backbone network 12. As shown, the hosts h1-h3 are connected to the router r1. The host h4 is connected to the router r2. The hosts h5-h6 are connected to the router r3. The hosts h7-h10 are connected to the router r4. The router r5 is connected to the router r2. The routers r1, and r3-r5 are connected to the backbone network 12. The backbone network 12 illustratively is an ATM network, the operation of which is discussed below. However, for purposes of the discussion in this section, the backbone network 12 may be any kind of network. While not shown for purposes of brevity, some hosts h1-h10 may be connected to their corresponding routers r1-r5 via bridges which bridges function in a similar fashion as routers for purposes of the discussion herein.

Figure 2:
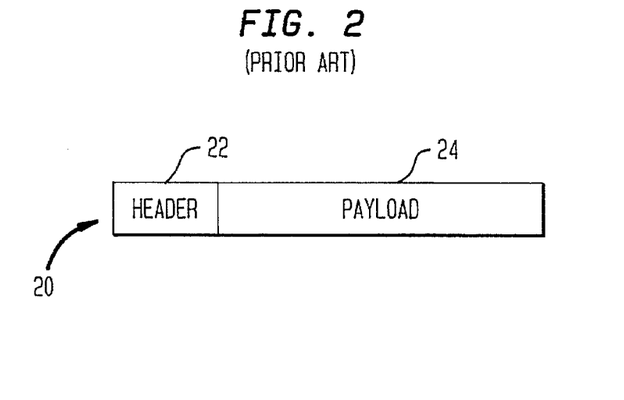
FIG. 2 shows a conventional packet organization.

Communication in the network 10 is achieved by transmitting a bitstream which is organized into packets via links that interconnect the routers r1-r5 and hosts h1-h10. (Such links may include optical fibers, twisted pairs of wires, coaxial cables, switches, etc.) FIG. 2 shows an illustrative packet organization which includes a header portion 22 and a payload portion 24. The header portion 22 contains information necessary for routing the packet to its intended destination, such as a virtual identifier or label which is assigned to a specific communication. The payload portion 24 contains a message which is to be conveyed between two hosts, e.g., the host h1 and the host h4.

A communications path is defined as a sequence of devices, called nodes, via which a packet (or, as discussed below, a cell) propagates from the source node to the destination node. A host which desires to transmit a message to another host is referred to as a source host or source node and the host which is intended to receive the message is referred to as a destination host or destination node. Each node between the source node and the destination node on the communications path is referred to herein as an intermediate node. Consider an example of packet transmission from the source node h1 to the destination node h4. In such a case, the communications path illustratively comprises the following sequence of nodes: host h1, router r1, (ATM switch x1, discussed below), router r5, router r2 and hosts h4.

When a source node, e.g., host h1, wishes to transmit a message to a destination node, e.g., host h4, the source node h1 generates one or more packets 20 as are necessary to convey the message. Such packets typically have a variable length up to a specified maximum (e.g., 536 bytes, 4388 bytes, etc.). The source node h1 writes the message in the payload portion 24 of the packets 20 and control information necessary to route the packets to the intended destination node h4 (e.g., the virtual identifier) into the header portion 22 of each packet 20. The source node h1 then transmits the packet(s) along the communications path to the destination node h4. In this case, the source node h1 transmits the packet to its attached router r1. The router r1 consults a routing table therein using the header information of each received packet to determine via which link to transmit each received packet. For instance, the router r1 may determine to transmit the packet(s) via the backbone network 12 to the router r5. The router r5 performs similar steps as the router r1. That is, the router r5 determines the appropriate link for transmitting each received packet. Illustratively, the router r5 determines to transmit the packet(s) received from the source node h1 to the router r2. Using a similar procedure, the router r2 determines to transmit the received packet(s) to the host h4.

Figure 3:
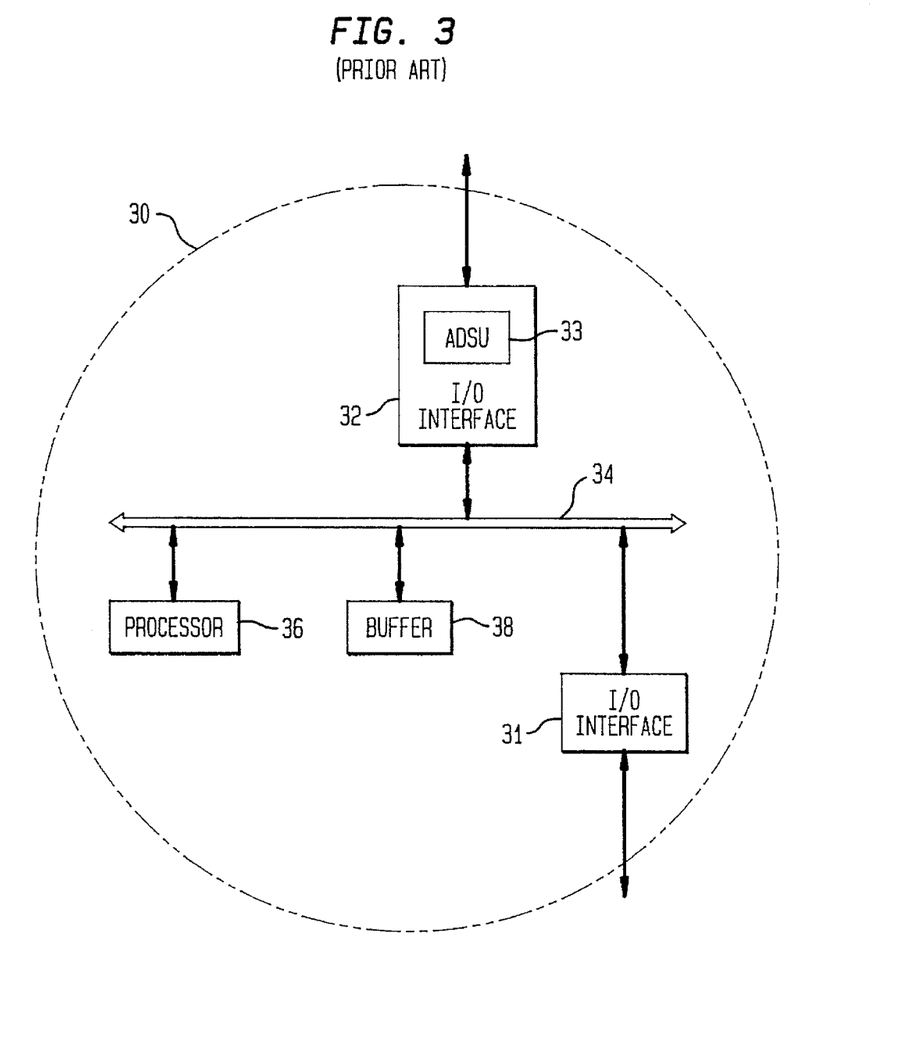
FIG. 3 shows a conventional router architecture.

FIG. 3 shows a basic architecture 30 of a router, e.g., the router r5. Each incoming and outgoing link is connected to an I/O interface 31, 32. Illustratively, the I/O interface 31 connects the router r5 to the router r2 and the I/O interface 32 connects the router r5 to the backbone network 12. Each I/O interface 31 and 32 is adapted to transmit and receive packets (or cells, as described below) according to the protocol of its attached links. (As shown, the I/O interface 32 includes an ATM Data Service Unit or ADSU 33 for communicating according to an ATM protocol. The ADSU 33 is described in greater detail below.) Each I/O interface 31 and 32 is connected to a bus 34. Also connected to the bus 34 is a processor 36 and a buffer 38. For purposes of simplicity, the buffer 38 is shown as a single memory. Alternatively, a separate buffer memory 38 may be provided for in each I/O interface 31 and 32. Packets which are received from an I/O interface 31 or 32 are temporarily stored in the buffer 38 under the control of the processor 36. The processor 36 then determines via which I/O interface 31 or 32 the packet must be transmitted. The packets are removed from the buffer 38 and transmitted according to a transmission schedule. Illustratively, the packets are transmitted via an I/O interface 31 or 32 according to a first-in first-out order (FIFO) transmission schedule. That is, packets scheduled to be transmitted from a particular interface 31 or 32 are transmitted in the same order that they were received at the router.

Asynchronous Transfer Mode (ATM) Communication

According to an ATM protocol, information is transmitted as a bitstream that is organized into fixed predetermined frames. Each frame has plural fixed size time slots or cells of, for example, 53 bytes, into which information is written. However, the cells are not assigned to specific communications in a predetermined fashion. Rather, the cells are dynamically allocated as needed for communications. In order to correlate cells with their intended destinations, each cell is provided with a header section in which control information is written. Likewise, each cell has a payload section of, for example, 47 bytes, for carrying a message or data to be communicated to a destination.

ATM networks can be used in both packet switched and non-packet switched communications networks. Furthermore, an ATM network can be used in any kind of a packet network. The basic operation of an ATM network is illustrated below in conjunction with a packet network.

An ATM network is illustratively used in the backbone network 12 of FIG. 1. As shown, each router r1, and r3-r5 is connected to an ATM switch x1, for example, via a DS3 link. Each DS3 ATM link is connected to an I/O interface, such as the I/O interface 32 (FIG. 3), which contains an ATM Data Service Unit or ADSU 33 (FIG. 3). The purpose of the ADSU is to convert packets to be transmitted via the ATM network 12 to cells and to convert cells received from the ATM network 12 to packets (for transmission as packets). As noted above, each cell has a size which is fixed and which is typically smaller than each packet. In converting packets to cells, the ADSU 33 therefore divides each packet into a number of cells. That is, the ADSU 33 generates a sufficient number of cells for carrying the information of each packet. The ADSU 33 writes the payload information of each packet into the payload section of the cells corresponding thereto. The ADSU 33 also writes appropriate header information into the header section of each cell including an indication of to which packet the cell corresponds. The ADSU 33 then transmits the cells via its link which is connected to the ATM network 12.

Referring again to FIG. 1, the transmitted cells are received at an input port 41-1, 41-2, 41-3 or 41-4 of the ATM switch x1. The received cells are conveyed by a switch fabric 45 to an appropriate output buffer 42-1, 42-2, 42-3 or 42-4 connected to an output port 43-1, 43-2, 43-3 or 43-4. That is, the switch fabric 45 directs the cells to the output buffer 42-1 to 42-4 of the output port 43-1 to 43-4 connected via the link on the communications path to the destination node. For instance, consider the above communications example, wherein a packet is transmitted from the source node h1 to the destination node h4 via a communications path including the sequence of intermediate nodes: router r1, ATM switch x1, router r5 and router r2. In this example, the switch fabric 45 routes the cells to the output buffer 42-4 of the output port 43-4 because this output port 43-4 is connected to the router r5.

The switch fabric 45 may be a large high speed memory which is accessed by the buffers 42-1 to 42-4. The buffers 42-1 to 42-4 only retrieve from the high speed memory 45 the appropriate cells, i.e., whose headers indicate (e.g., by the virtual identifier therein) that they must be transmitted from the connected output port 43-1 to 43-4. Alternatively, the switch fabric 45 is a high speed shared transmission medium which is commonly monitored by the output buffers 42-1 to 42-4. Illustratively, the output buffers 42-1 to 42-4 only retrieve those cells from the high speed shared transmission medium 45 having header information (e.g., a virtual identifier) indicating that the cell must be transmitted from the attached output port 43-1 to 43-4. In yet another alternative scheme, the input ports 41-1 to 41-4 access a table for mapping header information (e.g., a virtual identifier) of each cell to its appropriate output port 43-1 to 43-4. In such a case, the switch fabric 45 simply may be a multiplexer that responds to the mapping information for switching the cell to the appropriate output buffer 42-1 to 42-4. In yet another alternative implementation, the switch fabric 45 is a self routing batcher banyan network.

In any event, the switch fabric 45 routes the cells to the appropriate output buffer, e.g., the output buffer 42-4, wherein the cells are scheduled for removal and transmission according to some transmission schedule. Illustratively, the cells are transmitted according to a first-in first-out (FIFO) ordered transmission schedule. From there, the cells are transferred to an output port 43-4 connected to the output buffer 42-4. Thus, the cells are transmitted from the output ports 43-1 to 43-4 in the order of the first cell placed in the attached output buffer 42-1 to 42-4 to the last cell placed in the output buffer 42-1 to 42-4. The cells are then transmitted from the attached output port, e.g., the output port 43-4.

After the cells are transmitted, they arrive at a router, e.g., the router r5 on the communications path to the destination node, e.g., h4. In the router r5, the cells are received at the ADSU 33 therein. The ADSU 33 reconstitutes each packet from its constituent cells. Once reconstituted, the router r5 may transmit the packet on the path to its destination node (e.g., to the router r2).

Packet/Cell Loss and Flow Control

Ideally, all packets transmitted from a source node arrive at the destination node within a reasonable time. However, in actuality, this does not always occur. Packets may be lost (entirely not transmitted or corrupted beyond recognition) in the communications network 10 for a variety reasons. Often packets are lost because of congestion in the communications network 10. Consider that each buffer 38 in each router r1-r5 has a fixed size. Suppose communication occurs at the same speed on each incoming and outgoing link that connects a particular router. Furthermore, suppose that several packets arrive simultaneously at a router which all must be transmitted via the same link. In such a case, some packets must be stored in the buffer 38 until such time as they can be transmitted. Thus, the occupancy of the buffer 38 increases until there are no vacancies. If any further packets are received which must be stored in the buffer 38, the buffer 38 overflows and one or more packets must be dropped or discarded. Such circumstances where buffer overflow occurs is referred to herein as congestion.

Like packets, cells are also subject to loss in the ATM network. For instance, each output buffer 42-1 to 42-4 is of a finite size. It is possible that the occupancy of an output buffer 42-1 to 42-4 can increase if cells are inputted thereto faster than they are outputted from the attached output port 43-1 to 43-4. If a cell is to be inputted to an output buffer 42-1 to 42-4 which has run out of vacancies for storing cells therein, one or more cells must be dropped.

Note that packet congestion is partly a result of the nature in which hosts h1-h10 transmit their packets. Hosts h1-h10 tend to transmit packets in bursts of sequences of packets, separated by low or zero packet transmission intervals. This tends to create sequences of packets, or packet trains propagating in the communications system 10. Packet congestion frequently occurs because packet trains from different hosts, e.g., host h1 and host h3, arrive contemporaneously at the same router. Thus, many packets are received for transmission on the same link at a faster rate than can be accommodated by the router resulting in buffer filling and overflow.

A protocol, such as Transmission Control Protocol or TCP, may be provided for purposes of protecting against packet loss and for controlling the flow of packets into the network 10. The present invention is directed to protocols which control the flow of packets into a communications network 10 and is illustrated using the TCP protocol.

According to TCP, the hosts h1-h10 implement a "feedback" type of packet loss detection scheme. Each destination node, e.g., host h4, transmits a short (e.g., 64 byte) acknowledgment packet back to the source node acknowledging each packet via a feedback communications path. (The feedback communications path can simply be the inverse sequence of the forward communications path, i.e., host h4, router r2, router r5, ATM switch x1, router r1 and host h1 or can be a different sequence of nodes.) Furthermore, if the source node, e.g., host h1, transmits a sequence of packets, the source node can write a counter in the header of each packet of the sequence indicating the packet's ordinality in the sequence. The destination node h4 can examine the counter of each received packet. If a packet in the middle of a sequence is not received (the destination node h4 detects a first and a third, but not a second packet, of a subsequence of a sequence of packets), the destination node h4 transmits two acknowledgment packets for the packet immediately preceding the lost packet. TCP provides two mechanisms for a source node h1 to detect a packet loss, namely:

(1) The source node h1 fails to detect an acknowledgement packet within a certain time that depends on the estimated round trip propagation time. (The round trip propagation time is the time interval between the time of transmission of a packet from the source node h1 to the destination node h4 and the time of receipt of an acknowledgment packet at the source node h1 from the destination node h4.); or (2) The source node h1 receives multiple acknowledgement packets (e.g., two or three) for a particular packet of a sequence of transmitted packets (indicating that the packet following the acknowledged packet was not received at the destination node h4).

In response to detecting a lost packet, the source node h1 retransmits the lost packet.

The feedback can be viewed as beginning at the buffer of the intermediate node on the forward communications path (from the source node to the destination node) at which congestion occurs. For instance, consider the above packet transmission example from the source node h1 to the destination node h4. Suppose that when the packet arrives at the router r5, the buffer 38 (FIG. 3) at the router r5 is full. Thus, congestion exists in the communications network at the router r5. The router r5 can indicate the congestion by dropping or discarding the packet received from the source host h1. The absence of the dropped packet is "conveyed" to the destination host h4. The destination host h4 may detect the absence of the packet (as described above). If the destination node h4 detects the absence of the packet, the destination node h4 transmits an indication of the dropped packet back to the source host h1. Alternatively, the source host h1 deduces that a packet loss has occurred if the destination node does not transmit an acknowledgment for the dropped packet.

According to TCP, this feedback mechanism for detecting packet loss is also used by the source hosts h1-h10 to control the flow of packets into the communication networks from the source hosts h1-h10. Initially, hosts h1-h10 minimize the flow of packets into the communications network 10, i.e., regulate the number of packets that the sources h1-h10 transmit into the communications network 10 at one time. In TCP, each source h1-h10 achieves this end by keeping track of the total number of packets transmitted by that particular source host h1-h10 that are propagating in the communications network 10 at one time. That is, the source hosts h1-h10 keep track of those packets:

(1) for which the source host h1-h10 has not yet received an acknowledgment packet from a destination host h1-h10 (indicating that the packet was received or dropped), and (2) which have been propagating less than the above mentioned certain time which depends on the estimated round trip propagation time.

The threshold maximum number of non-acknowledged packets is referred to in the art as the "window size" of the source host h1-h10. According to TCP, a source host h1-h10 transmits a packet only if less than the threshold maximum number of packets are propagating in the communications network 10 at that time. Alternatively, the hosts h1-h10 may transmit packets at a lower rate than the maximum rate of the link to which they are attached. As time progresses, each host h1-h10 slowly increases the packet flow into the network (by slowly increasing the window size at each source host h1-h10 or by increasing the rate at which each source host h1-h10 transmits its packets). Invariably, the load on (i.e., the number of packets propagating in) the communications network 10 increases until packet loss occurs. The occurrence of packet loss is communicated to the source hosts h1-h10 via the feedback mechanism discussed above. In addition to retransmitting the lost packets, the source hosts h1-h10 treat the packet loss indication as an indication of congestion in the communications network 10. The source hosts h1-h10 which experience a packet loss therefore take steps to reduce the existence of congestion by reducing the flow of packets into the communications network. In the case of TCP, the hosts h1-h10 which detect one or more packet losses reduce their window sizes (the hosts h1-h10 may reduce their window sizes upon detecting a single packet loss, a threshold number of packet losses, a number of packet losses in a given unit of time, etc.). Alternatively, the hosts h1-h10 reduce the rate at which they transmit packets.

The reduction in packet transmission by the hosts h1-h10 can vary amongst different protocols (and different versions of TCP such as "Reno," "Tahoe," "Vegas," etc.). According to some protocols, the flow of packets is reduced in accordance with the total number of lost packets. According to other protocols, the flow of packets is reduced to a very low flow regardless of the number of lost packets during a certain specified period of time. In any event, the reduction in packet transmission is typically drastic in comparison to the amount of congestion in the network. The hosts h1-h10 may even suspend packet transmission entirely for a relatively long period of time. See V. Jacobson, Congestion Avoidance and Control, PROC. OF ACM SIGCOMM, pp. 314–329 (1988) regarding Tahoe TCP.

Figure 4:
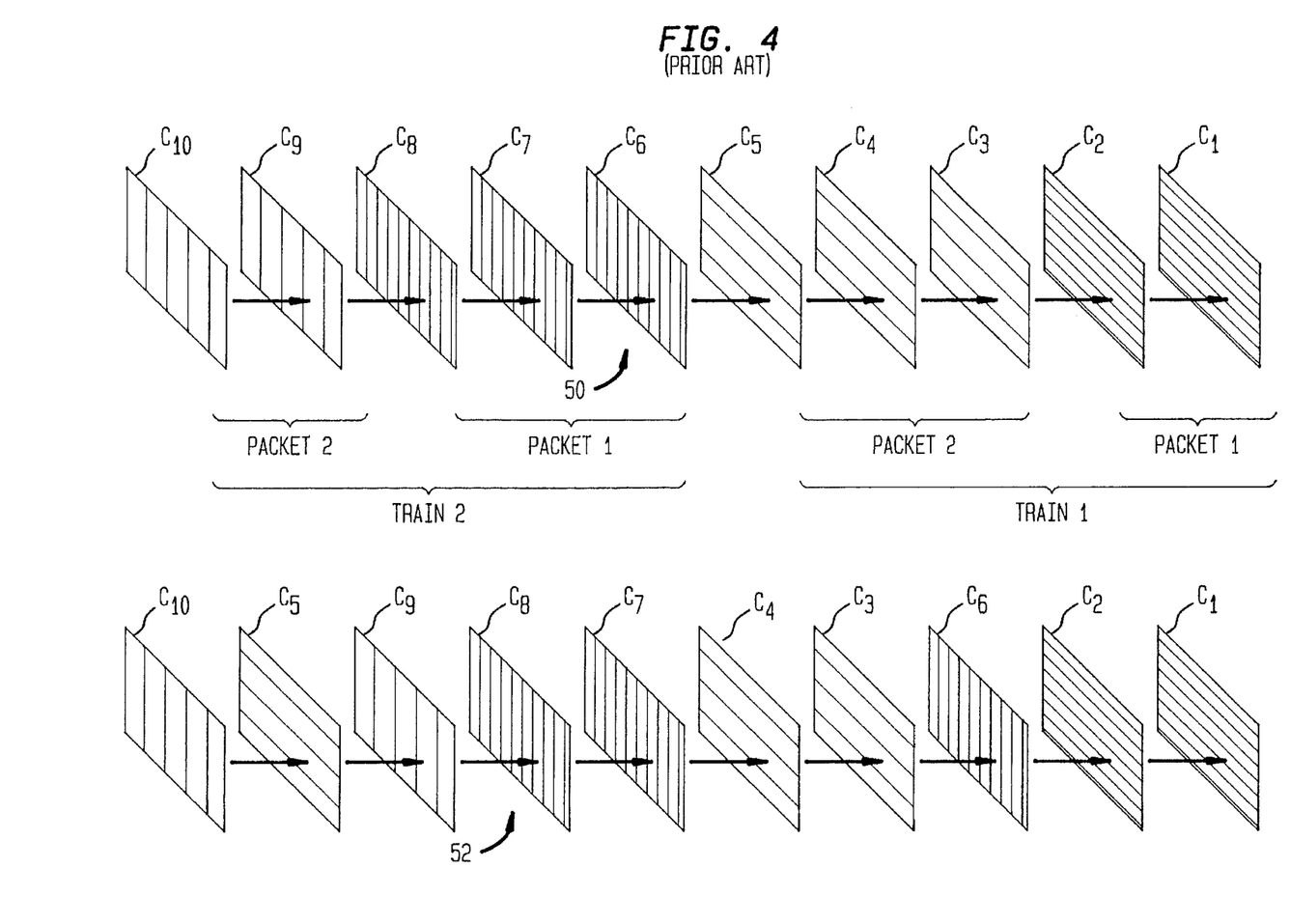
FIG. 4 illustrates the interleaving of cells in an output buffer of an ATM switch.

Consider now the implications of packet trains or cell trains (or both) on the ordering of packets or cells in a buffer (such as the buffer 38 of FIG. 3 or an output buffer 42-1 to 42-4 of FIG. 1 ). During certain periods of time, few packet trains are propagating on the communications network 10. As such, the likelihood is low that packets or cells of different trains arrive at a router r1-r5 or switch x1 which must be transmitted via the same link. (The likelihood of congestion and buffer overflow is also low.) During such periods of time, the packets or cells of each train are stored in the buffer 38 or output buffer 42-1 to 42-4 in a relatively contiguous order in that the packets or cells from the same train are adjacent to each other. This is shown in FIG. 4 ordering 50 for cells c1, c2, c3, c4, c5, c6, c7, c8, c9, and c10, wherein cells c1-c5 corresponds to a first train and cells c6-c10 correspond to a second train. On the other hand, during other periods of time, many packet trains are simultaneously propagating on the communications network 10. The likelihood is higher that packet or cell trains arrive at a router r1-r5 or ATM switch x1 which must be transmitted via the same link. (The likelihood of congestion and buffer over flow are also high.) During such other periods of time, the cells or packets are stored in an interleaved fashion in that packets or cells from different trains are adjacent to each other. This is shown in FIG. 4 ordering 52 for cells c1-c10.

A conventional technique employed by routers and ATM switches for packet and cell dropping is referred to as "drop from the tail." That is, if congestion causes a FIFO buffer 38 or 42-1 to 42-4 to overflow, any subsequently received packets or cells which are to be stored in the buffer 38 or 42-1 to 42-4 are discarded. Because such subsequently received packets or cells would be stored at the end of the FIFO buffer 38 or 42-1 to 42-4 (i.e., would be last transmitted from the I/O interface 31 or 32 or output port 42-1 to 42-4), these packets may be thought of as being dropped from the end or "tail" of the buffer 38 or 42-1 to 42-4.

The drop from the tail strategy, however, result in the delay of the conveyance of the indication of the congestion. Specifically, the transmission of the indication of congestion is delayed for the period between the time that the packet drop occurs and the time the dropped packet would have been removed from the buffer for transmission according to the transmission schedule. For large bandwidth-delay-product networks (i.e., networks in which the product of the delay and the number of bits transmitted during the delay is large) the delay can seriously degrade performance. During the delay, congestion can worsen because the source hosts h1-h10, which do not yet know of the congestion, continue to increase their packet flows. Thus more packets or cells must be dropped. The large bandwidth-delay-product can result in two disadvantageous results, namely:

(1) The congestion indications distributed over the packets of many hosts rather than a small number of hosts. Thus, many hosts, instead of a small number of hosts, reduce their packet transmission rates under TCP. As noted above, such reduction tends to result in an over-correction or over-response by each host that experiences a packet loss. If many hosts reduce their packet transmission rates, the transmission capacity of the communications system 10 may be drastically under-utilized for relatively long periods of time. See T. V. Lakshman & U. Madhow, *Performance Analysis of Window-Based Flow Control Using TCP/IP: The Effect of High Bandwidth-Delay Products and Random Loss*, IFIP TRANS. C-26, HIGH PERF. NETWORKING V, pp. 135–50 (1994).

(2) Each source host which does receive an indication of congestion tends to receive an indication for many packets or cells. This is particularly disadvantageous if the source hosts reduce their packet or cell flows as an increasing function of the number of cells or packets for which they received a congestion indication.

In addition, in the case where packets are divided into cells for transmission in an ATM network another disadvantage can occur called the packet shredder phenomenon. In the packet shredder phenomenon, the number of lost packets increases because cells are discarded for many packets rather than a few packets. Again, this effect occurs due to the high likelihood of interleaving of cells at the tail end of the buffer in the event of congestion. Note that in packet shredding, many cells already in the buffer corresponding to the packets of the dropped cells are nevertheless transmitted thereby unnecessarily utilizing transmission and buffer resources. See A. Romanov & S. Floyd, *Dynamics of TCP Traffic over ATM Networks*, PROC. ACM SIGCOMM CONF., pp. 303–313 (1994).

A partial solution to the problem of over-correction by hosts in the event of packet dropping due to congestion in a TCP network (i.e., this solution has not been proposed for cells in ATM networks) has been proposed by in S. Floyd & V. Jacobson, *Random Early Detection Gateways for Congestion Avoidance*, IEEE/ACM TRANS. ON NETWORKING, vol. 1, no. 4, pp. 397–413, Aug., 1993. This solution is referred to herein as Random Early Detection or RED. According to this solution, the routers adapted for implementing RED monitor the packet traffic patterns therein. If the routers recognize that congestion is threatening (i.e., there is a likelihood of future packet-dropping resulting congestion), the routers randomly drop a small fraction of the packets. The source nodes of the dropped packets, retransmit the dropped packets and reduce their packet transmission rates. According to RED, because only a small fraction of packets are dropped in the event of a threat of congestion, fewer source nodes react and over-reaction is reduced.

To partly remedy the over-utilization of resources issue, when a cell is dropped, the buffer 42-4 is searched for other cells corresponding to the packet of the dropped cell. These cells are then also discarded. If the buffer is large, it may be possible to discard every cell of the packet for which a cell is initially dropped at the tail. However, if the buffer is small, it is possible that some cells of the packets may have already been transmitted.

N. Yin & M. G. Hluchyj, *Implication of Dropping Packets from the Front of the Queue*, SEVENTH ITC, Oct. (1990) has suggested a drop from front strategy for packet buffers communications networks which do not feedback an indication of congestion to the source hosts. This reference is not directed to the same problems that are present in feedback networks considered above. Rather, this reference teaches a drop from front strategy to solve a different problem, namely, decreasing the average delay in the buffer for packets and cells. According to the strategy of this reference, packets or cells are dropped from the front of a buffer in the event of buffer overflow. That is, if an incoming packet or cell must be inserted into a full buffer of a router or ATM switch, the first packet or cell scheduled to be transmitted, rather than the incoming packet or cell, is discarded to create a vacancy for the incoming packet. According to the strategy proposed in this reference, the average delay of the packets or cells is decreased in comparison to drop from tail as long as the average is taken over those packets and cells that are indeed transmitted (i.e., not dropped). This reference thus recommends drop from front for time-critical packets.

It is therefore an object of the present invention to overcome the disadvantages of the prior art.

SUMMARY OF THE INVENTION

This and other objects are achieved by the present invention. The present invention is directed to a communications network environment similar to a conventional network wherein communication is achieved by transmitting a bit-stream organized into data units such as packets or cells (or both).

According to one embodiment, the packets or cells are transmitted from a source node to a destination node via a forward communications path of the network which includes one or more intermediary nodes. Generally, these packets or cells are buffered at each intermediary node of the forward communications path. It is desirable to inform the source node when congestion occurs in the communications network. To accomplish this rapidly, an intermediate node which is congested takes an action to communicate the congestion to a destination node of the cell or packet. The indication is then transmitted back to the source node via a feedback communications path. The action taken by the intermediate node is performed on the packet or cell which is scheduled to be transmitted first (soon) rather than last (later). The action may be dropping the packet or cell or setting a congestion bit in the packet or cell.

The communication of congestion is speeded up because the indication of congestion is transmitted from the congested intermediate node to the destination node as soon as possible. Thus, the source nodes act sooner to reduce congestion rather than later when congestion is worse thereby shortening the overall congestion period. This provides two benefits. First, because the congestion period is shortened, a congestion indication is likely to be transmitted to fewer source nodes. Second, the source nodes which receive such an indication receive fewer indications. The latter advantage curtails the flow reduction of source nodes which reduce their packet or cell flows as a function of the number of congestion notifications which they receive.

In short, a feedback communications network and method of operation are disclosed for enhancing the feedback of congestion to source nodes. By transmitting congestion indications for the first packets or cells to be transmitted from buffers of congested intermediate nodes, the invention speeds up the communication of congestion thereby reducing the congestion period.

DETAILED DESCRIPTION OF THE INVENTION

An investigation of TCP traffic in the conventional communications network 10 (FIG. 1 ) has shown that the communications network 10 cycles through three phases. During a first phase, there is no congestion and the output buffers 38 or 42-1 to 42-4 of the routers r1-r5 or the ATM switch x1 are not close to full. During the first phase, the hosts h1-h10 slowly increase the rate at which they transmit packets or cells. Thus, the traffic slowly increases on the communications network 10. During a second phase, congestion occurs but is not noticed by the hosts h1-h10. Furthermore, the source hosts h1-h10 have not yet otherwise deduced (from failing to receive an acknowledgement packet) that the communications network 10 is congested. The output buffers 38 or 42-1 to 42-4 fill and alternate between almost full and full. Congestion indications for packets or cells are transmitted (e.g., packet or cell loss begins to occur) but the source hosts h1-h10 do not yet detect the congestion because acknowledgement packets indicating the existence of congestion have not yet been received at the source hosts h1-h10 from the destination hosts h1-h10. Finally, during the third phase, the source hosts h1-h10 receive acknowledgement packets from the destination hosts h1-h10 indicating (or otherwise deduce) that packet loss has occurred. The source hosts h1-h10 then drastically reduce their transmission rates depending on how many packets have been lost.

Note that there is a delay between the occurrence of congestion (second phase) and the detection of congestion and reduction thereof by the source hosts h1-h10 (third phase). Before the third phase occurs, congestion continues to increase. It is therefore desirable to reduce the delay between the occurrence of congestion and the detection of congestion by the source hosts. This would reduce the amount of congestion which in turn would reduce the total number of packets or cells for which an indication of congestion is transmitted. As a result, fewer source hosts will receive an indication of congestion and thus fewer source hosts will reduce their packet or cell flows. Furthermore, consider the situation where a source host reduces its packet or cell flow as a function of the number of cells or packets for which it receives an indication. By reducing the total number of cells or packets for which an indication is transmitted, each source host which does receive an indication tends to receive indications for fewer packets or cells. Thus, such source hosts tend to curtail their packet or cell flow reductions.

According to the present invention, congestion is mitigated by shortening the delay between the occurrence of congestion (or likelihood of congestion) and the transmission of an indication of congestion). To that end, in the event of congestion, the buffers of the intermediate nodes are adapted to transmit an indication of congestion for the first cell or packet to be transmitted according to the transmission schedule of that node. Such a policy can be implemented in either a packet network, an ATM network or a hybrid packet-ATM network such as is shown in FIG. 1. Furthermore, in implementing this policy, the indication of congestion may be transmitted by dropping a packet or cell or setting a congestion bit in the packet or cell. When indications are conveyed by dropping packets or cells, the implementation is referred to herein as a drop from front strategy.

The invention is now illustrated using the hybrid packet-ATM network, wherein congestion is indicated by dropping cells. In particular, in the event an incoming cell is to be stored in a full output buffer 42-1 to 42-4 of the ATM switch x1, a sequence of one or more cells are dropped from the front of the output buffer 42-1 to 42-4 to create a vacancy for the incoming cell.

This provides a number of advantages. First, by dropping the very next cell to be transmitted, the ATM switch x1 conveys an indication immediately that the packet corresponding thereto has been dropped. In contrast, in tail dropping, the loss of a packet is not conveyed from the ATM switch until one buffer drain time later, where the buffer drain time equals the total time for a packet to propagate from the tail to the front of the output buffer 42-1 to 42-4. Thus, the destination nodes h1-h10 detect the packet loss sooner and transmit an acknowledgement packet indicating the packet loss to the source nodes h1-h10 sooner. As a result, the source hosts h1-h10 tend to reduce the rate at which they transmit packets sooner thereby reducing the congestion in the ATM switch x1. As noted above, this tends to reduce the number of hosts h1-h10 which reduce their packet flows.

As a corollary to the first benefit, another benefit is achieved, namely, the provision of greater fairness in allocation of communication network resources. Network resources, in particular, communications bandwidth, are not always equally shared by all source hosts. Some hosts have longer round trip transmission delays than other source hosts. Investigations of communication network traffic have revealed that the source hosts with short round trip transmission delays tend to utilize a larger fraction of the transmission bandwidth than source hosts with large round trip transmission delays. The discrimination of drop from tail against the large round trip delay traffic is discussed in T. V. Lakshman & U. Madhow, *Performance Analysis of Window-*

Figure 5:
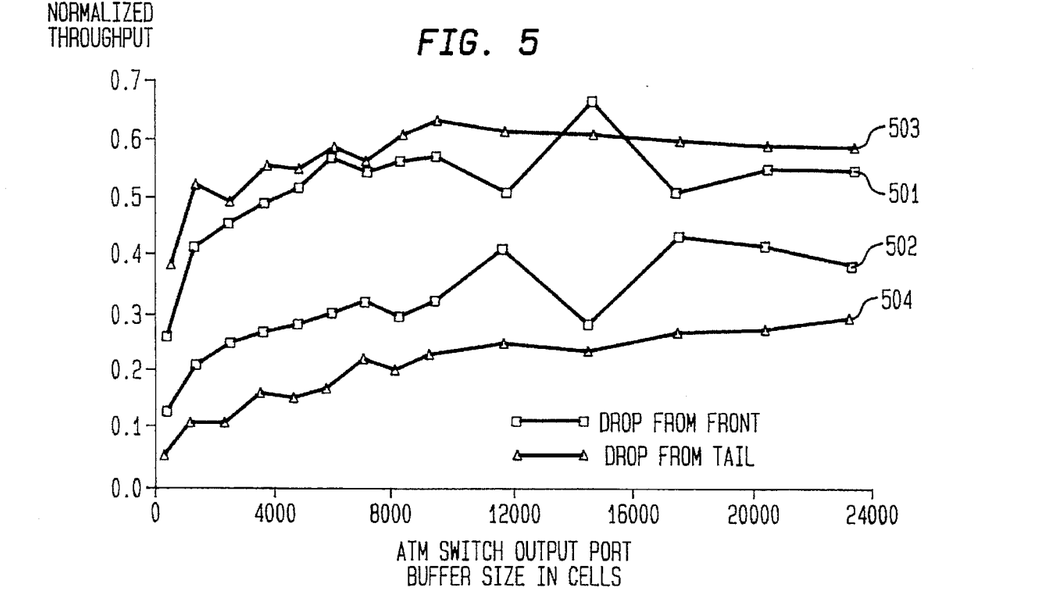
FIGS. 5 and 6 are graphs which compare the throughput achieved according to the present invention to the throughput achieved according to the prior art.
Figure 6:
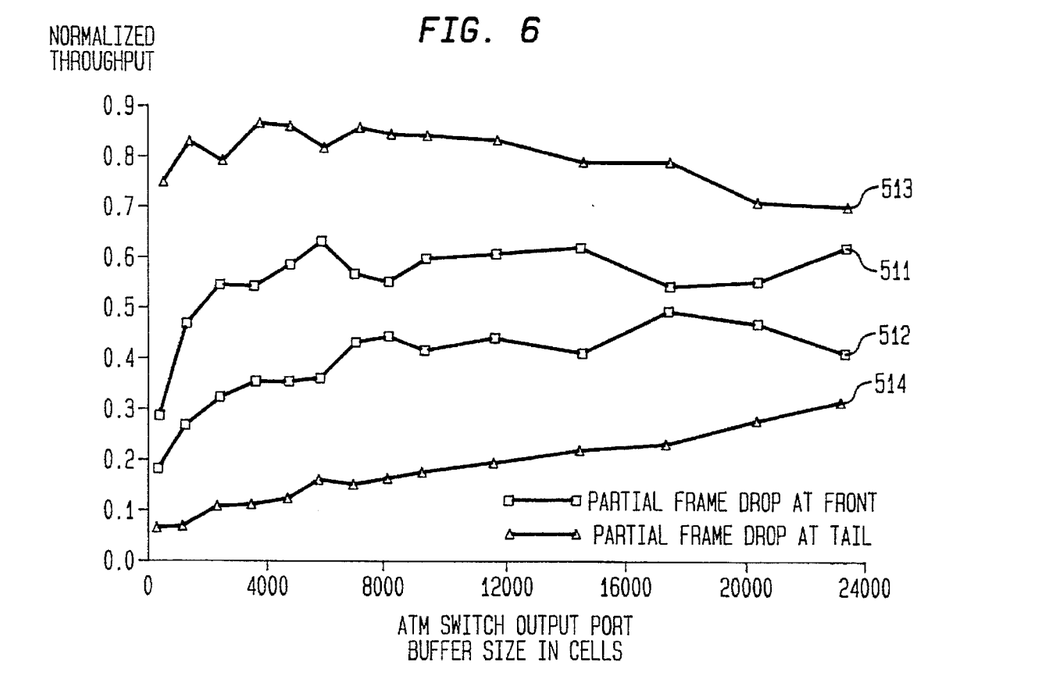

Based Flow Control Using TCP/IP: The Effect of High Bandwidth-Delay Products and Random Loss, IFIP TRANS. C-26, HIGH PERF. NETWORKING V, pp. 135–50 (1994). However, simulations for TCP over ATM networks which implement the present invention tend to reduce this discrimination. FIGS. 5 and 6 show contrast the drop from front strategy according to the present invention to a conventional drop from tail strategy. In FIGS. 5 and 6, the ordinate axis is the normalized throughput for the traffic and the abscissa is the size of the output buffers 42-1 to 42-4 of the ATM switch x1. FIG. 5 compares a pure drop from front strategy according to the present invention for 40 msec and 80 msec round trip delay traffic (curves 501 and 502, respectively) to pure drop from tail for 40 msec and 80 msec round trip delay traffic (curves 503 and 504, respectively). FIG. 6 compares a partial drop from front strategy according to the present invention to a partial tail drop (wherein "partial" means that all cells of a packet, for which at least one cell is dropped, are also dropped). In FIG 6, curves 511 and 512 represent 40 msec and 80 msec round trip delay traffic, respectively, for partial drop from front and curves 513 and 514 represent 40 msec and 80 msec round trip delay traffic, respectively, for partial drop from tail. As shown, the drop from front strategy tends to allocate bandwidth more equally amongst long and short round trip delay traffic (curves 501 and 502, or 511 and 512), i.e., the difference between the long and short round trip delay traffic throughputs is smaller, than drop from tail (curves 503 and 504 or 513 and 514).

Second, as noted above, congestion is often caused by the simultaneous arrival of cell trains of packet trains originating from different source hosts h1–h10. Thus, a full output buffer 42-1 to 42-4 tends to store the more recently received cells (at the tail of the output buffer 42-1 to 42-4) in an interleaved fashion. In contrast, the cells to be transmitted next (at the front of the output buffer 42-1 to 42-4), which were received during a period of low traffic, tend to be in a relatively contiguous, sequential order. Therefore, cells sequentially dropped from the front tend to all correspond to a single or only a small number of packets. In contrast, cells sequentially dropped from the tail tend to correspond to many different packets. Thus, by dropping cells from the front, fewer packets are lost thereby conserving the storage capacity of the output buffers 42-1 to 42-4 and the transmission capacity of the links.

As an enhancement, the full output buffer 42-1 to 42-4 not only drops the cell at the front of the full output buffer 42-1 to 42-4, the full output buffer 42-1 to 42-4 also drops from the front all future cells corresponding to the same packet as the dropped cell. This strategy is referred to as a partial drop from front strategy. This can provide an increase in performance since any other cells in the front of the output buffer 42-1 to 42-4 which correspond to the same packet as the dropped cell are also discarded. However, the likelihood that at least one cell corresponding to the packet of the dropped cell has already been transmitted is higher than in a like corresponding drop from tail scheme. Nevertheless, unlike the drop from tail scheme, no search of the output buffer 42-1 to 42-4 is required. Rather, as cells reach the front of the output buffer 42-1 to 42-4 they are dropped if they correspond to the packet of a previously dropped packet. Note that the last cell of each packet contains an end of packet indication. Thus, the output buffer 42-1 to 42-4 can drop all cells corresponding to a particular packet until a cell is dropped that corresponds to the particular packet and which contains an end of packet indication.

Figure 7:
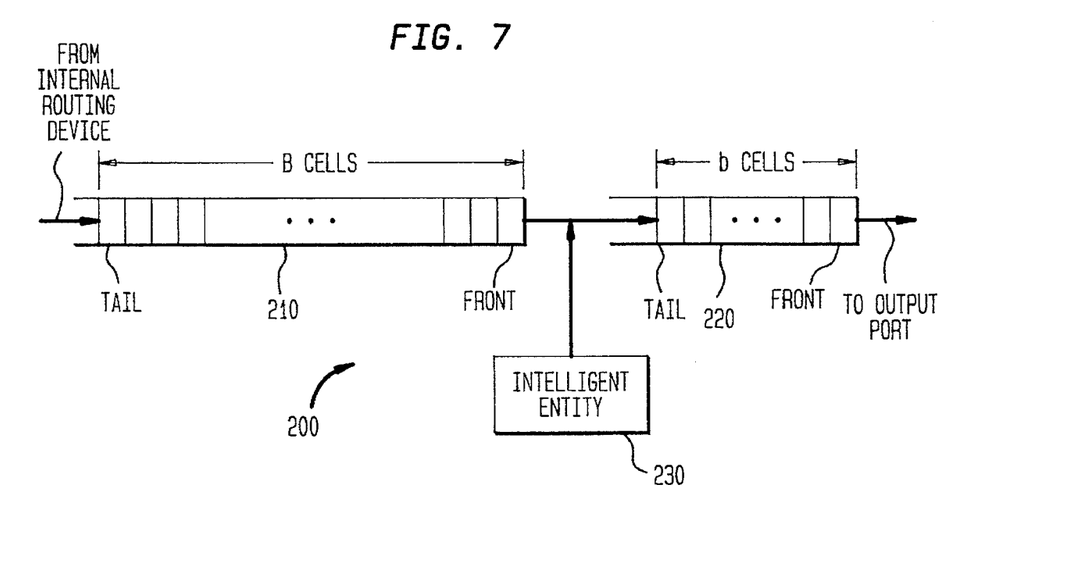
FIG. 7 illustrates an output buffer of a ATM switch according to an embodiment of the present invention in greater detail.

Referring to FIG. 7 an illustrative output buffer architecture 200, e.g., for the output buffer 42-4, according to an embodiment of the present invention is shown in greater detail. As shown, the output buffer 200 includes two FIFO memories 210 and 220. The FIFO memory 210 is illustratively a large memory 21 0 with a capacity for storing B cells where B is illustratively between 1,000 and 10,000. The large FIFO memory 210 illustratively operates at the same speed as the DS3 links and receives each cell outputted from the switch fabric 45 (FIG. 1) at its tail. The FIFO memory 220 is smaller and has a capacity for storing b cells where b is illustratively between 1 and 10 (and is preferably about 4). The cells outputted from the head of the small FIFO memory 220 are outputted via the attached output port, e.g., the output port 43-4.

An intelligent entity 230, such as a processor executing suitable software, a finite state automaton, etc., is also provided. The intelligent entity 230 controls the removal of cells from the front of the large FIFO memory 210 for placing the cells in the tail of the small FIFO memory 220 or for discarding the removed cells. For instance, the intelligent entity 230 removes a cell from the front of the large FIFO memory 210 and places the cell in the tail of the small FIFO memory 220 each time a vacancy occurs in the small FIFO memory 220. Furthermore, each time a cell is to be placed in the large memory and the large FIFO memory 210 is full (occupancy of cells in the large buffer 210 equals B), the intelligent entity 230 discards a cell at the front of the large FIFO memory 210.

Note, by providing a smaller FIFO memory 220 it is possible to decouple the transmission of cells from the small output buffer 200 from the dropping of cells by the intelligent entity 230. The intelligent entity 230 which typically operates much faster than the transmission rate of the cells. Thus, by decoupling the intelligent entity 230 from the transmission of cells, the intelligent entity 230 need not operate in strict synchronicity with the transmission of cells.

The intelligent entity 230 illustratively can control the removal of cells in a more intricate fashion. For instance, the intelligent entity 230 can implement a RED strategy for cell dropping from the front. As before, whenever a vacancy occurs in the small FIFO memory 220, the intelligent entity 230 removes a cell from the front of the large FIFO memory 210 and places it in the tail of the small FIFO memory 220. Unlike before, if the occupancy of the large FIFO memory 210 reaches a critical level L<B and the small FIFO memory 220 is full, the intelligent entity 230 discards a cell from the front of the large memory 210.

Consider the anticipating character of the aforementioned cell dropping. By careful selection of L, the large buffer 210 always has vacancies for receiving a burst of incoming cells. For instance, if there are k input ports (i.e., in FIG. 1 there are k=4 input ports 41-1, . . . , 41-4) for the ATM switch x1 or k internal buffers in the switch fabric 45 (FIG. 1), then selecting L=B-k always ensures that there is adequate space in the large FIFO memory 210 for receiving incoming cells.

Figure 8:
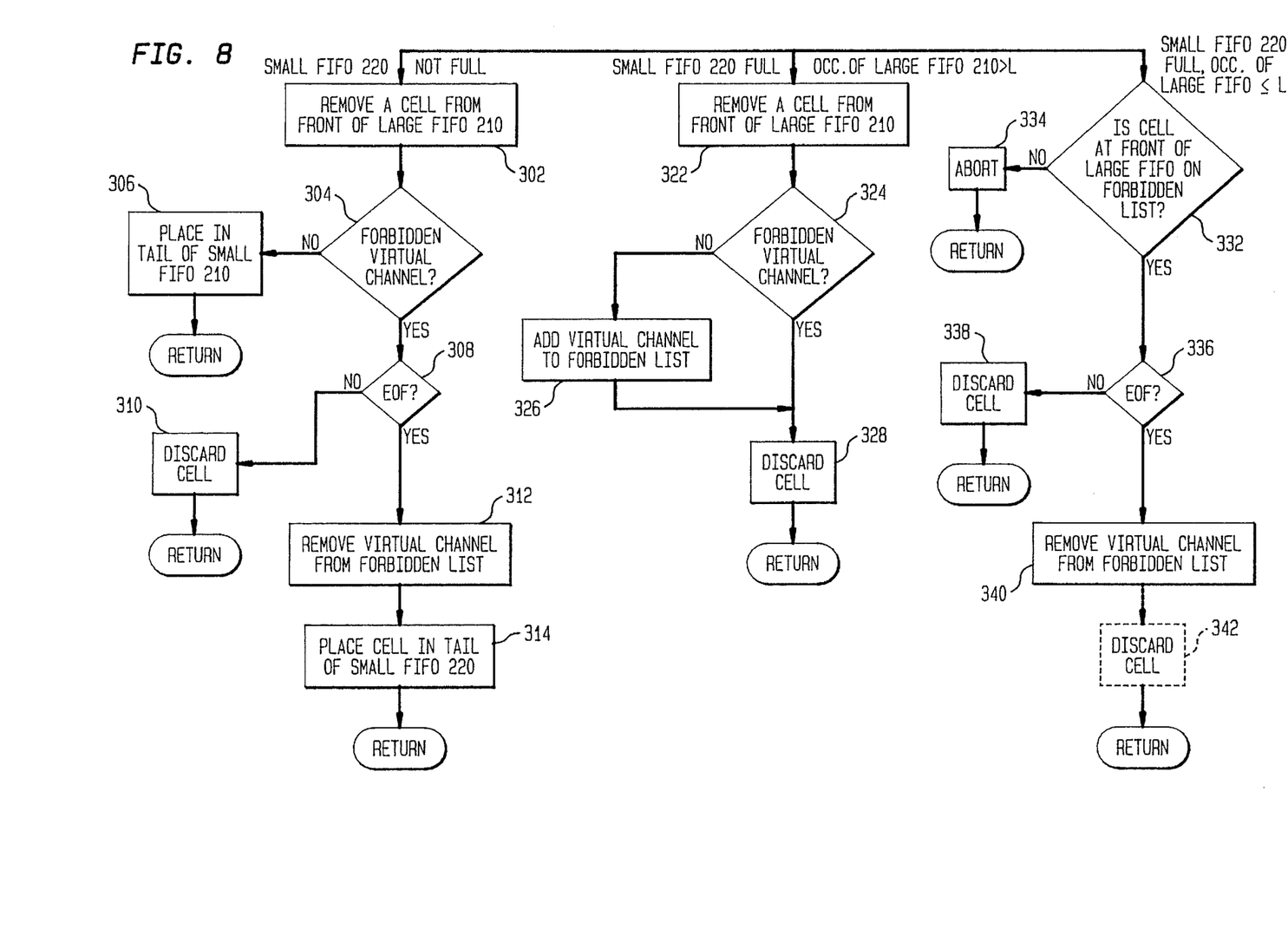
FIG. 8 is a flowchart which schematically illustrates a first drop from front strategy according to the present invention.

Both the pure and RED versions of drop from front described above can be extended to drop each cell corresponding to a packet of a dropped cell. FIG. 8 is a flowchart which schematically illustrates such a process for the RED version of drop from front. In this process, it is presumed that the correspondence of cells to packets is indicated in the cell headers as follows. Each cell contains an indication (or virtual channel number) of a virtual channel to which it corresponds. This is a form of virtual identifier which is assigned to a particular communication. Packets are delineated by cells which contain end of packet indications (or flags). Thus, the cells which correspond to a particular packet include the sequence of cells containing a particular virtual channel indication from the first cell immediately following a cell containing an end of packet indication (or simply the very first cell) through, and including, the very next cell containing the particular virtual channel indication and an end of packet indication. Furthermore, the intelligent entity 230 maintains a list of packets (by their virtual channel indication) corresponding to a damaged or forbidden packet for which at least one cell has already been discarded.

The intelligent entity 230 executes steps 302–314 whenever the small FIFO memory 220 is not full. In step 302, the intelligent entity 230 removes a cell from the front of the large FIFO memory 210. In step 304, the intelligent entity 230 determines if the virtual channel indication of the removed cell is on the forbidden list. If not, the intelligent entity 230 executes step 306 wherein the intelligent entity 230 places the removed cell in the tail of the small FIFO memory 220. Otherwise, the intelligent entity 230 executes step 308. In step 308, the intelligent entity 230 determines if the cell contains a virtual channel indication on the forbidden list but does not have an end of packet indication. If so, the intelligent entity executes step 310 wherein the intelligent entity 230 discards the cell. Otherwise, the intelligent entity 230 executes step 312. If the intelligent entity 230 executes step 312, then the cell must contain a virtual channel indication on the forbidden list and an end of packet indication. In such a case, the intelligent entity 230 removes the virtual channel indication from the forbidden list (this is the last cell of the damaged packet). In step 314, the intelligent entity 230 places the cell in the tail of the small FIFO memory 220. This ensures that the destination node quickly determines that the corresponding packet has been lost (because only the very ending piece of the packet is received). Alternatively, the intelligent entity 230 can discard this packet in step 314.

Whenever, the small FIFO memory 220 is full and the occupancy of the large FIFO memory 21 0 is greater than the threshold L (or alternatively, whenever the an incoming cell is received and both the large and small FIFO memories 210 and 220 are full), the intelligent entity 230 executes steps 322–328. In step 322, the intelligent entity 230 removes a cell from the front of the large FIFO memory 210. In step 324, the intelligent entity determines if the virtual channel indication of the cell is on the forbidden list. If so, the intelligent entity proceeds directly to step 328. However, if the virtual channel indication of the removed cell is not on the forbidden list, the intelligent entity 230 first executes step 326 wherein the intelligent entity 230 adds the virtual channel indication to the forbidden list. In step 328, the intelligent entity 230 discards the removed cell.

Whenever the small FIFO memory 220 is full and the occupancy of the large FIFO memory 210 is less than or equal to the threshold L (or alternatively, whenever the small FIFO memory 220 is full and the large FIFO memory 210 is not full), the intelligent entity 230 executes steps 332–342. In step 332, the intelligent entity determines if the cell at the front of the large FIFO memory 210 contains a virtual channel identification that is on the forbidden list. If not, the intelligent entity 230 executes step 334 wherein the intelligent entity 230 aborts this procedure. Otherwise, the intelligent entity executes step 336. In step 336, the intelligent entity 230 determines if the cell contains an end of packet indication. If not, the intelligent entity 230 executes step 338 and discards the cell. If the cell does contains an end of packet indication, then the intelligent entity 230 executes step 340. In step 340, the intelligent entity 230 takes the virtual channel indication off the forbidden list. Optionally, the intelligent entity may also execute step 342 in this case wherein the intelligent entity discards the cell.

In a modification of the output buffer architecture 200, plural large FIFO memories 210 are provided including one for each cell priority. Thus, each output port 43-1 to 43-4 (FIG. 1) would have a single small FIFO memory 420 and plural large FIFO memories 410. As suggested by the name, each cell may be assigned a priority which, amongst other things, controls the likelihood that the cell is dropped. This likelihood is controlled by the size of the corresponding large FIFO memory 410 and the number of cells of like priority contained in the output buffer.

Figure 9:
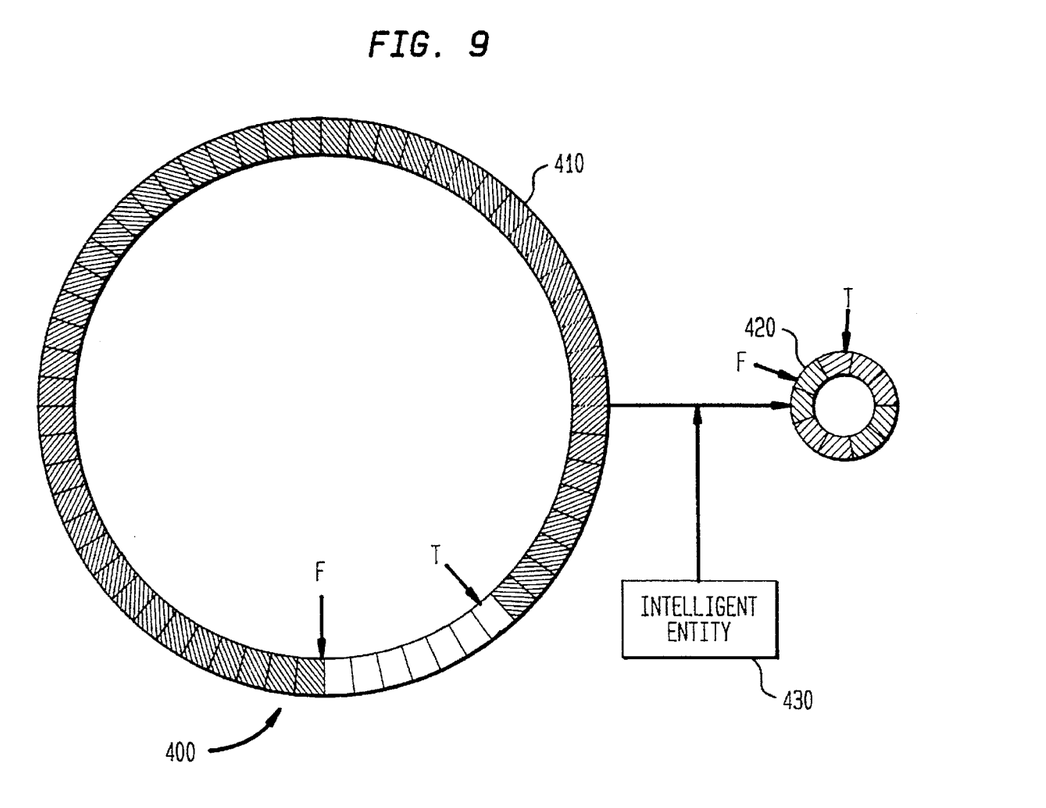
FIG. 9 illustrates an output buffer of a ATM switch according to another embodiment of the present invention.

FIG. 9 shows another output buffer architecture 400 according to an embodiment of the present invention. As shown, a large FIFO memory 410, a small FIFO memory 420 and an intelligent entity 430 are provided which perform identical functions as before. In this implementation, both the large FIFO memory 410 and the small FIFO memory 420 are implemented using circular buffers. Each circular buffer 410 and 420 is depicted as a continuous annulus. (Conventionally, however, circular buffers are simply a sequence of memory locations with a wrap-around addressing circuit. The wrap-around addressing circuit converts address which exceed the last memory location of the sequence to "wrap-around" to the beginning of the sequence and converts addresses which fall below the first memory location of the sequence to "wrap-around" to the last memory location of the sequence.) As shown, the large FIFO memory 410 is provided with a front pointer F and a tail pointer T whereas the small FIFO memory 420 is provided with a front pointer f and a tail pointer t. The front pointer F and f point to the cells which are at the front of the FIFO memory 410 or 420 whereas the tail pointers T and t point to the next available storage location at the tail of the FIF0 memory 410 or 420 for receiving an incoming cell. The shaded storage locations indicate that a cell is stored therein. Whenever a cell is to be stored in the FIFO memory 410 or 420, it is stored in the location pointed to by the tail pointer T or t. The tail pointer T or t is then moved clockwise once storage location to point at the very next storage location of the FIFO memory 41 0 or 420. Likewise, when a cell is to be removed from a FIF0 memory 410 or 420, the cell is removed from the storage location pointed to by the front pointer F or f. The front pointer F or f is then likewise moved clockwise one storage location so as to point at the very next storage location.

Initially, or when a cell is removed from a FIFO memory 410 or 420 and the front and tail pointers F and T or f and t point to the same storage location, the associated FIFO memory 410 or 420 is empty. Likewise, when a cell is stored in a FIFO memory 41 0 or 420 and the front and tail pointer F and T or f and t point to the same storage location, the associated FIFO memory 410 or 420 is full.

Such pointers make a pure drop from front strategy simple to implement. For instance, assume that the large FIFO memory 410 is full. Thus, the front F and tail T pointers point to the same storage location. If a cell is subsequently received, it is simply placed in the cell pointed to by the tail pointer T, thus over-writing the cell at the front of the large FIFO memory 410. The front and tail pointers F and T are then both moved clockwise one storage location. In such a strategy, the small FIFO memory 420, and the intelligent entity 430 can even be eliminated; the cells outputted from the large FIFO memory 410 being transferred directly to the attached output port.

In short, a method for transmitting packets or cells (or both) in a communications network is disclosed. The packets or cells are transmitted along a forward communications path in a network from a source node via one or more intermediary nodes to a destination node. At the intermediary nodes, the packets or cells are received in a buffer. The packets or cells are transmitted along the forward communications path according to a transmission schedule. In the presence of congestion at one of the intermediary nodes, an indication of the congestion is provided to the destination nodes of the first packets to be transmitted according to the schedule. The indication can be in the form of dropping a cell or packet or setting a congestion bit therein. An indication of the congestion of the first packets or cells is provided by the destination nodes of the first packets or cells to the source nodes of the first packets or cells via a feedback communications path. By transmitting the indication of congestion from the first packet or cell to be transmitted from the buffer, the source nodes learn of the congestion sooner. This dramatically shortens the congestion period which reduces the total number of indications that are transmitted. As a result, fewer source nodes receive an indication of congestion and those source nodes that do receive indications receive indications for a smaller number of packets or cells.

Finally, the above discussion is intended to be merely illustrative. Numerous alternative embodiments may be devised by those having ordinary skill in the art without departing from the spirit and scope of the following claims.

We claim:

1. A method for transmitting data units in a communications network comprising the steps of:

transmitting said data units along a forward communications path in a network from source nodes via one or more intermediary nodes to destination nodes, at said intermediary nodes, receiving said data units in buffers and transmitting said data units stored in said buffers along said forward communications path according to a transmission schedule, in the presence of congestion at one of said intermediary nodes, providing an indication of said congestion to said destination nodes of first data units being transmitted according to said schedule, and providing an indication of said congestion at said one intermediary node by said destination nodes of said first data units to source nodes of said first data units.

2. The method of claim 1 wherein said data units are packets.

3. The method of claim 1 wherein said data units are cells.

4. The method of claim 1 wherein said step of providing an indication of congestion to said destination nodes further comprises the step of:

dropping said first data units.

5. The method of claim 1 further comprising the step of:

receiving one of said indications of congestion from one of said destination nodes of said first data units at one of said source nodes of said first data units, and in response to said one indication, reducing the transmission of data units from said one source node into said communications network.

6. The method of claim 1 wherein said step of providing an indication of congestion to said destination nodes further comprises the step of:

setting a congestion bit in at least one of said data units.

7. The method of claim 1 wherein said steps of transmitting and providing are performed according to Transmission Control Protocol (TCP).

8. The method of claim 1 wherein said steps of transmitting and receiving and said steps of providing are performed according to Transmission Control Protocol (TCP) over asynchronous transfer mode (ATM).

9. The method of claim 1 further comprising the step of, in the presence of congestion at one of said intermediary nodes, dropping said first data units to be transmitted according to said schedule.

10. The method of claim 9 further comprising the step of providing to said destination nodes of said first data units an indication that said first data units have been dropped.

11. The method of claim 10 further comprising the step of providing from said destination nodes of said first data units to said source nodes of said first data units an indication that said first data units have been dropped.

12. A method for transmitting packets in a communications network comprising the steps of:

transmitting said packets along a forward communications path in a network from a source node via a sequence of two or more intermediary nodes to a destination node, at a first intermediary node of said sequence, dividing each packet into a plurality of cells and transmitting said cells of said packet along said forward communications path, at a second one of said intermediary nodes, receiving said cells in a buffer and transmitting said cells stored in said buffer along said forward communications path according to a transmission schedule, in the presence of congestion at said second intermediary node, dropping the first cells to be transmitted according to said schedule, if a cell into which a particular packet is divided is dropped, dropping each later cell into which said particular packet is divided, and providing an indication of said congestion for said particular packet by the destination nodes of said particular packet to the source node of said particular packet.

* * * * *